(12) United States Patent
Smith Devine

(10) Patent No.: US 10,509,858 B1
(45) Date of Patent: Dec. 17, 2019

(54) DATA PROCESSING IN SPREADSHEET WORKSHEETS

(71) Applicant: Sigma Sciences Limited, Stirlingshire, Scotland (GB)

(72) Inventor: Robert Laurie Smith Devine, Stirlingshire (GB)

(73) Assignee: Sigma Sciences Limited, Stirlingshire, Scotland (GB)

( * ) Notice: Subject to any disclaimer, the term of this patent is extended or adjusted under 35 U.S.C. 154(b) by 146 days.

(21) Appl. No.: 15/069,932

(22) Filed: Mar. 14, 2016

Related U.S. Application Data

(60) Provisional application No. 62/133,427, filed on Mar. 15, 2015, provisional application No. 62/133,431, filed on Mar. 15, 2015.

(51) Int. Cl.
 *G06F 17/24* (2006.01)

(52) U.S. Cl.
 CPC .................. *G06F 17/246* (2013.01)

(58) Field of Classification Search
 None
 See application file for complete search history.

(56) References Cited

U.S. PATENT DOCUMENTS

| | | | | |
|---|---|---|---|---|
| 7,266,763 B2 * | 9/2007 | Peyton-Jones | ........ | G06F 17/246 707/999.001 |
| 7,624,372 B1 * | 11/2009 | Stewart | ...................... | G06F 8/34 717/106 |
| 8,656,269 B1 * | 2/2014 | Yuasa | ............... | G06F 17/30896 715/212 |
| 8,656,271 B2 | 2/2014 | Vaysierre et al. | | |
| 9,037,961 B1 * | 5/2015 | Mansell | ................ | G06F 17/246 715/212 |
| 9,311,289 B1 * | 4/2016 | Kaptur | ................... | G06F 17/246 |
| 9,317,495 B2 * | 4/2016 | Khen | ....................... | G06F 9/541 |
| 2002/0007372 A1 * | 1/2002 | Bauchot | ................ | G06F 17/246 715/213 |
| 2003/0110191 A1 * | 6/2003 | Handsaker | ............ | G06F 17/246 715/212 |
| 2005/0081141 A1 * | 4/2005 | Jonsson | .................... | G06F 8/34 717/116 |
| 2005/0223051 A1 * | 10/2005 | Arakaki | ................ | G06F 17/246 708/490 |
| 2006/0069696 A1 * | 3/2006 | Becker | ................... | G06F 17/246 |
| 2006/0129929 A1 * | 6/2006 | Weber | ................... | G06F 17/246 715/267 |

(Continued)

OTHER PUBLICATIONS

ExtendOffice, How to add/insert prefix or suffix to range of cells in Excel, Published: Jul. 24, 2013, pp. 1-4.*

*Primary Examiner* — Howard Cortes

(74) *Attorney, Agent, or Firm* — Lodestone Legal Group; Jeromye V. Sartain

(57) ABSTRACT

A system and methods for defining spreadsheet worksheet functions capable of returning more than one output value to a worksheet with the layout of the returned values being customizable through the use of named ranges on the worksheet. The mapping of an output value to a destination cell (or range) is achieved by using a naming convention, wherein the name of the output parameter as defined in the worksheet function is automatically mapped to a worksheet range having the same name.

30 Claims, 5 Drawing Sheets

(56) References Cited

U.S. PATENT DOCUMENTS

| | | | |
|---|---|---|---|
| 2008/0168341 A1* | 7/2008 | Payette | G06F 17/246 |
| | | | 715/212 |
| 2009/0113388 A1* | 4/2009 | Lindhorst | G06F 9/45512 |
| | | | 717/115 |
| 2009/0319553 A1* | 12/2009 | Le Brazidec | G06F 17/246 |
| 2012/0137203 A1* | 5/2012 | Schodl | G06F 17/246 |
| | | | 715/215 |
| 2013/0013995 A1* | 1/2013 | Khen | G06F 9/541 |
| | | | 715/217 |
| 2014/0164895 A1* | 6/2014 | Matheson | G06F 17/246 |
| | | | 715/212 |
| 2015/0286552 A1* | 10/2015 | Michelsen | G06F 11/3684 |
| | | | 714/38.1 |
| 2015/0378977 A1* | 12/2015 | Moharir | G06F 17/246 |
| | | | 715/219 |

\* cited by examiner

```
IRegressionOutput = interface
  property DegreesOfFreedom: integer;
  property FValue: double;
  property Intercept: double;
  property RSquared: double;
  property Slope: double;
  property RegressionSS: double;
  property ResidualSS: double;
end;
```

Fig. 2

DATA PROCESSING IN SPREADSHEET WORKSHEETS

RELATED APPLICATIONS

This application claims priority pursuant to 35 U.S.C. § 119(e) to and is entitled to the filing dates of U.S. Provisional Patent Application Ser. No. 62/133,427, filed Mar. 15, 2015, and U.S. Provisional Patent Application Ser. No. 62/133,431, filed Mar. 15, 2015. The contents of the aforementioned applications are incorporated herein by reference.

FIELD OF THE DISCLOSURE

The present disclosure relates to data processing, and in particular to the processing of data in spreadsheet worksheets.

BACKGROUND OF THE DISCLOSURE

Spreadsheets are ubiquitous in modern business and almost all businesses rely on them for at least some of their business processes. In typical usage, what is commonly referred to as a "spreadsheet" is in fact a file (or a "workbook") that is populated by one or more spreadsheet worksheets. The spreadsheet model and associated data will normally be distributed across multiple worksheets, and a workbook will often contain more than one model. Spreadsheet workbooks are commonly stored on disk as a file, either on the user's desktop computer or mobile device, or on a network shared folder.

A key element of any spreadsheet system is the concept of a worksheet function. All spreadsheet systems incorporate a set of standard worksheet functions (e.g. SUM, AVERAGE etc) and some systems also include the ability for a user to define their own custom functions. The most commonly used spreadsheet worksheet functions return a single value to the cell within which the function is embedded. For example, "=SUM(A1:A9)" will add all the values in cells A1 to A9 and insert their sum in the cell where the user has typed the formula. The exception to this is functions that can operate as so-called Array Functions, which is the only type where multiple values can be returned.

In the case of an array function the user selects a range of cells on the worksheet and the function populates the cells within the selected range with the different calculated values. The main disadvantage of array formulas is that the values are returned as a single block of contiguous numbers, with no indication as to what each value represents. This in turn means that the user must refer to the documentation in order to understand what each value means. In addition, the single block of contiguous numbers makes it impossible to create flexible user-interfaces—e.g. there is no way to insert cells into the array for descriptive labels.

In addition, when typing worksheet formulas into worksheet cells, existing approaches require the user to explicitly specify the cell (or range) location (or name) for each non-optional input parameter. It is not currently possible for such parameter lists to be automatically populated.

SUMMARY OF THE DISCLOSURE

These teachings pertain to systems and methods for creating automatic parameter mappings in spreadsheet worksheet functions. In particular, such mappings allow users to create multi-output worksheet functions and to automatically populate worksheet function input parameters.

According to a first aspect of the disclosure there is provided a method of data processing in a spreadsheet workbook, comprising: retrieving values to be used as input values; processing the input values to derive one or more output values; and outputting the resulting output values to one or more named output worksheet ranges; wherein each of the output worksheet ranges are mapped to a corresponding output parameter name defined within a function that performs said processing.

Optionally, retrieving values comprises retrieving values from one or more input worksheet ranges.

The values may be retrieved from other sources that are not part of a spreadsheet, for example, a database or web-based source. It is also to be appreciated that references in the following to operating on a range of cells in a worksheet or workbook can also generally be applied to operating on other data sources.

Optionally, the name of each named worksheet range is mapped to a corresponding output parameter with the same name.

Optionally, the name of either the named worksheet range or the output parameter contains a pre-defined suffix or prefix.

Optionally, the input worksheet ranges for the processing are named, and each of the input worksheet ranges are mapped to a corresponding input parameter name defined within a function that performs said processing.

Optionally, the name of each named worksheet range is mapped to a corresponding input parameter with the same name.

Optionally, the name of either the named worksheet range or the input parameter comprises a pre-defined suffix or prefix.

Optionally, the required input values are automatically populated based on a parameter list of a function that carries out the processing.

Optionally, any number of input parameters are optional on the list even if they are required within the function.

Optionally, a user interface is provided for a user to define input worksheet ranges and/or output worksheet ranges.

Optionally, a user can customize an output format of a worksheet by creating or deleting different named ranges.

Optionally, different outputs can be presented to different users.

Optionally, a user can specify different layouts for the different output values.

Optionally, the output ranges are located next to cells with descriptive labels.

Optionally, mapping within processing the data in the input values to derive one or more output values is implemented with a software object.

Optionally, after the processing has been completed, an output object is created that holds output names and their corresponding values within a set of output object properties.

Optionally, after the processing has been completed, a list of output objects is created, each of which contains a single output name and its corresponding value.

Optionally, an output object exposes object property names and types to be determined by a system at runtime.

Optionally, an output object list exposes output names and types to be determined by a system at runtime.

Optionally, the processing is implemented with a script which is in turn managed by a scripting engine which is in turn linked to an application spreadsheet engine.

Optionally, the processing is performed by one or more worksheet functions which are incorporated into a compiled software library which is in turn linked to an application spreadsheet engine.

Optionally, output definitions are stored separately from code which implements said processing.

Optionally, output values from multiple functions are communicated to the workbook via a single global dispatcher function.

Optionally, output values are communicated to the workbook by each function individually.

Optionally, an output object or list of outputs is returned to a spreadsheet engine, which in turn manages the copying of the output values to the matching named ranges.

Optionally, output values generated by the worksheet function are derived from calculated values.

Optionally, values involved in the processing are retrieved from a web service.

Optionally, values involved in the processing are retrieved from a data source such as a database or file.

According to a second aspect of the disclosure there is provided a method of data processing in a spreadsheet workbook, comprising: retrieving values from one or more input worksheet named ranges to be used as input values; processing the data in said input worksheet ranges to derive one or more output values; and outputting the resulting output values to one or more output worksheet ranges; wherein each of the input worksheet ranges are mapped to a corresponding input parameter name defined within a function that performs said processing.

Optionally, the name of each named worksheet range is mapped to a corresponding input parameter with the same name.

Optionally, the name of either the named worksheet range or the input parameter comprises a pre-defined suffix or prefix.

The second aspect may also comprise the features of the first aspect.

According to a third aspect of the disclosure there is provided a data processing system comprising a spreadsheet workbook and a processor arranged to retrieve values to be used as input values, process the input values to derive one or more output values, and output the resulting output values to one or more output worksheet ranges; wherein the input and/or output values comprise named ranges, and each named range is mapped to a corresponding parameter name defined within a function that performs said processing.

According to a fourth aspect of the disclosure there is provided A computer program product comprising instructions, that, when executed on a computing device, enable it to function as a data processing system arranged to retrieve values to be used as input values, process the data in said input values to derive one or more output values, and output the resulting output values to one or more output worksheet ranges; wherein the input and/or output values comprise named ranges, and each named range is mapped to a corresponding parameter name defined within a function that performs said processing.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

These teachings describe a system and methods for implementing spreadsheet worksheet functions that are able to return multiple calculated values with an arbitrary layout on the worksheet. In this approach the different return values are each mapped to a cell or range on the worksheet by using the output parameter names, and linking them to corresponding named cells/ranges. Note that throughout these teachings we will often refer to named cells and named ranges interchangeably.

An important aspect of the current disclosure is that it can be implemented using standard spreadsheet technology: There is no requirement to invoke concepts such as cell objects. Any objects that might be involved in the described disclosure are software objects that reside entirely within the function library: The spreadsheet engine need not have any knowledge of their existence. This is in contrast to other proposed approaches to extending the usefulness of worksheet functions.

BRIEF DESCRIPTION OF THE DRAWINGS

The present disclosure will be described, by way of example only, with reference to the accompanying drawings, which show the following:

FIG. 2: An example of a software code interface for the results of a single-factor linear regression, defined using Object Pascal.

DETAILED DESCRIPTION OF THE PREFERRED EMBODIMENTS

These teachings describe a system and methods for implementing spreadsheet worksheet functions that are able to return multiple calculated values with an arbitrary layout over one or more worksheets. Advantageously, our approach can also be used to automatically populate the input values for a worksheet function.

In computer software, a self-contained functional block of code that has an associated single return value is commonly referred to as a "function". A block of code that does not have an associated return value is commonly called a "procedure". Both functions and procedures can have one or more input parameters, and procedures can have output parameters wherein the values passed into the procedure can be modified for subsequent use by the calling code. In some languages, e.g. Python, multiple values can be returned from a function in the form of a "tuple". More commonly, multiple values are returned by wrapping the values in a separately defined structure (e.g. a "struct" or "record"). Furthermore, the term "argument" refers to the actual value assigned to a parameter, although in practice the terms "parameter" and "argument" are often used interchangeably. In these teachings we will use the terms "parameter", "value" and "argument" interchangeably.

It is also important to note that when the term "value" is used this can correspond to a single value for a single cell, or a set of values for a plurality of cells.

Also, a "range" of cells can include one or more worksheet cells, and that those cells can be contiguous or non-contiguous.

Figure 1:
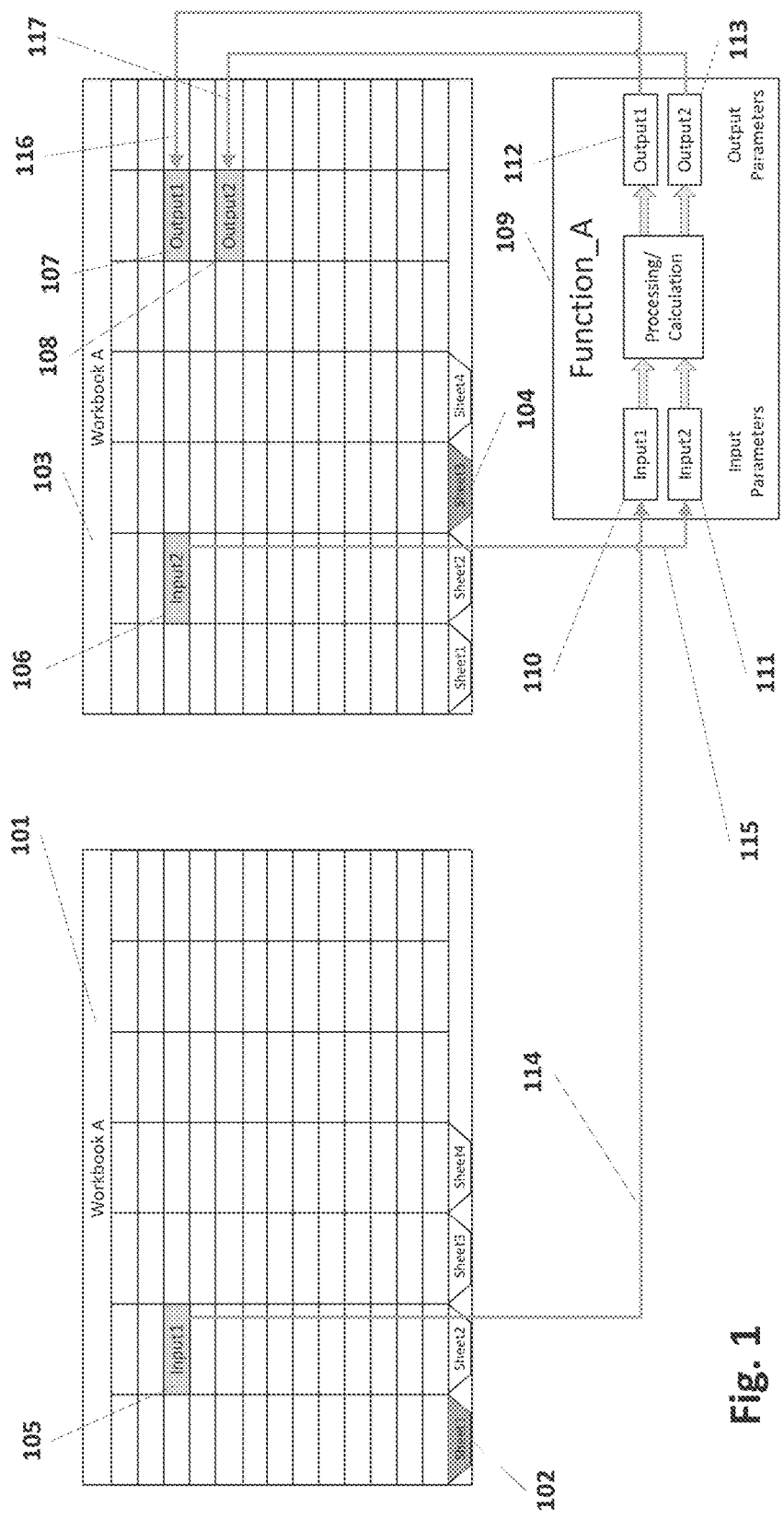
FIG. 1: High-level conceptual diagrammatic depiction of a multi-output worksheet function.

FIG. 1 illustrates, in simplified overview, a high-level conceptual diagrammatic depiction of an example system embodying our approach within a spreadsheet application. In FIG. 1 we show two views of a spreadsheet workbook: a first view 101 where Sheet1 102 is the active worksheet and a second view 103 where Sheet3 104 is active.

Sheet1 102 contains a named cell Input1 105 while Sheet3 104 contains three named cells: Input2 106, Output1 107 and Output2 108. For illustration purposes we assume that Input1 105 can be accessed from any worksheet in the workbook (i.e. it has workbook-wide scope) and that Input2 106, Output1 107 and Output2 108 have worksheet-level scope (i.e. they can only be accessed from within Sheet3 104.

Also shown in FIG. 1 is a schematic of a worksheet function 109 ("Function_A") which has two input parameters (Input1 110 and Input2 111) and two output values (Output1 112 and Output2 113). Advantageously, our approach exploits name-based mappings which in turn determine which cell values are passed to the worksheet function, and also which worksheet cells the function output values are passed to. It is important to realise that this mapping is between properties that are internal to the worksheet function, and named cells (or ranges) on the worksheet itself. In FIG. 1 the mappings are indicated by the connecting lines 114, 115, 116 and 117.

As already described, within the spreadsheet workbook the source and destination cells (or ranges) are defined using named ranges. There are a number of possible approaches to implementing the mapping within the function, and for the purposes of illustration we will now describe an exemplary embodiment based on the use of a software object created by the worksheet function. In this example we will consider the scenario of multiple output values for the function, which therefore involves the use of an output object. The basic principles also apply to input values, which are discussed in more detail at a later point in these teachings.

In FIG. 2 we show a simple interface 201 that defines a number of properties for an output object that will be created within the function. For illustration purposes we have based this on a worksheet function that performs a simple linear regression (e.g. LINEST in Microsoft Excel). The key feature required for an output object is that it exposes so-called Run Time Type Information (RTTI—sometimes referred to as Reflection) which allows the object property names and types to be determined by the system at runtime. For example, in FIG. 2 we have a "DegreesOfFreedom" property 202 which is of integer type: The system retrieves this information at runtime and attempts to map the "DegreesOfFreedom" property name to a named cell/range in the workbook with the same name.

Figure 3:
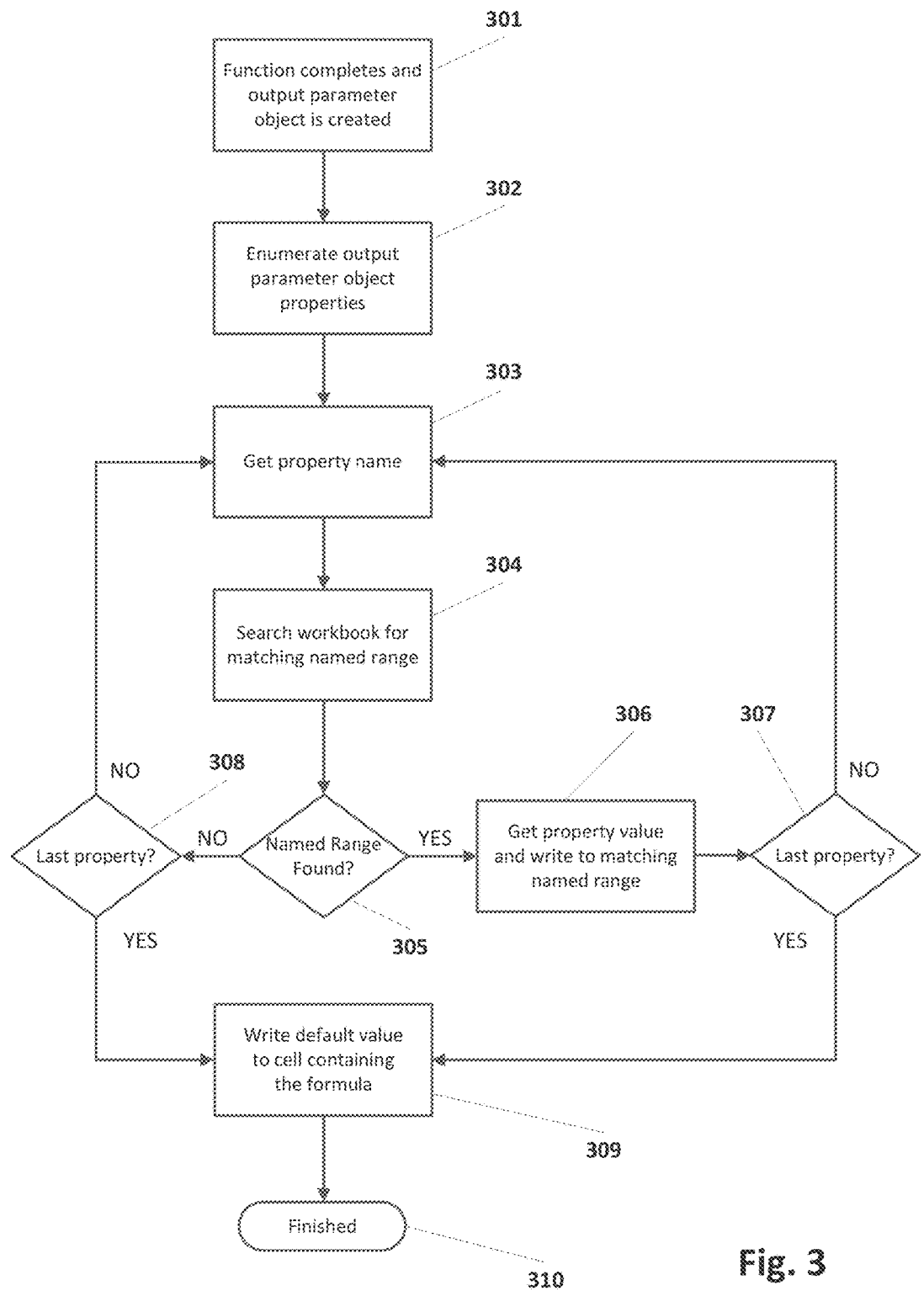
FIG. 3: Flow diagram for passing output values to a workbook.

FIG. 3 shows an illustrative flow diagram for the workflow involved in processing the output object of a multi-output worksheet function. After the function calculations have been completed the worksheet function creates an output object that holds the required output values 301. Code within the function then enumerates each property in the output object and, for each property found, checks for a matching named range (or cell) in the calling workbook. If a matching name is not found then the function simply ignores the output value and moves to the next property. If a matching name is found then the value (or values) for the property is inserted into the worksheet named range.

Advantageously, we can see that the user can customize the output format of the worksheet simply by creating or deleting different named ranges (or cells). This feature can be very useful where only a subset of the output function is required or desired. For example, in certain circumstances we might want to restrict which outputs are presented to different groups of users: Such user groups could be differentiated in terms of experience, permissions etc.

We can also see that it becomes straightforward for the user to specify different layouts for the different output values. The output ranges can be located next to cells with descriptive labels, for example, in contrast to the simple array output of conventional array formulas.

Typically, multiple worksheet functions will be incorporated into a compiled software library which is in turn linked to the application spreadsheet engine. For example, in the popular Microsoft Excel spreadsheet application a compiled function library can be implemented as a so-called XLL, or as a COM add-in. These teachings will assume the use of a compiled library when describing the different embodiments. However, it should be noted that there are other possible ways to implement worksheet functions, and by extension the systems and methods described in these teachings. The Visual Basic for Applications scripting language provided by Microsoft Excel is one example of a script-based alternative.

When building a multi-output worksheet function, the user defines the function outputs, specifying the output name and type (a number, date etc). In a preferred embodiment, internally the function generates an output object with properties corresponding to the defined outputs: this object is specified within generated wrapper code and is embedded within the code of the worksheet function. All of this happens without requiring user intervention—they need only define the output parameters of the worksheet function—i.e. the name and type.

In order to separate definitions from implementation, the output definitions can be stored separately from the user's worksheet function code, e.g. using a format such as XML or JSON. The wrapper code is then generated at the point that the user's function code is compiled into the library file. This in turn means that changes in how the wrapper code is generated will be applied to all appropriate associated worksheet function libraries. It also means that the software code in the function does not necessarily need to be changed when the output definitions are edited, and vice-versa.

The means by which output values are communicated to the workbook can be implemented in a number of ways, and two possible implementation approaches are as follows:
Single Dispatcher Function
Self-contained within each function In the single dispatcher scenario each function library contains a central function that dispatches the input parameters to the relevant function and receives an output object returned by that function.

The dispatcher function holds a reference to the calling worksheet (and hence the associated workbook) and upon receipt of the output object executes the workflow illustrated in FIG. 3. It searches first the worksheet and then the workbook for ranges with names that match the property names of the output object. If it finds a matching name then it (i) checks the range size against the output size (i.e. single value or array) and then (ii) checks the data types. If everything matches correctly then the dispatcher retrieves the output value and writes it to the matching named range in the workbook.

The advantage of the single dispatcher is that a reference to the calling worksheet is only required at one point: The functions that carry out the processing need have no knowledge of the worksheet.

In the self-contained approach each worksheet function gets a reference to the worksheet and workbook, and handles the population of the output cells directly (using the type of workflow shown in FIG. 3). The type and range checks run are exactly as for the single dispatcher case.

In yet another embodiment, an output object or list of outputs is returned to the spreadsheet engine, which in turn manages the copying of the output values to the matching named ranges (again using the FIG. 3 workflow, or similar). There are a number of ways in which the copying of the output values to the worksheet named ranges can be achieved: The different embodiments described here are intended to be illustrative and do not form an exhaustive list.

Note that the output values generated by the worksheet function can be derived from a number of sources. For example:
Calculated values
Retrieved from a web service
Retrieved from a data source such as a database or file These sources are given for illustration purposes only, and other possible data sources, and variants of the above, will be apparent to those skilled in the art.

It is important to realize that the creation of an internal object which is queried using RTTI/Reflection is only one possible implementation, and a number of others can be implemented. One alternative is to use an output parameter list, with each item in the list consisting of either a simple record (sometimes known as a "struct") or a simple object. The record or object would have at least the following fields:
ParameterName
ParameterType
ParameterValue
Defining Outputs on a Worksheet On the worksheet where the function is to be used, the user must define named cells (or ranges for array outputs) with names that correspond to the names of the function output parameters. In a preferred embodiment each library will have a standard query function that returns a list of available functions and the names of their input and output values and the corresponding types.

The provision of such a standard function allows users to easily define named input and output cells and ranges. In a preferred embodiment, the system will provide a user interface (e.g. in the form of a software wizard) that simplifies the process of associating named cells/ranges with function input and output values. For example, there might exist a conflict between an existing named cell that should not be over-written (a cell with a formula is one case) and the user interface should notify the user of such conflicts.

Defining Input Parameters

Although worksheet functions as implemented in some existing spreadsheet applications can use named ranges in their argument lists, the user must still type the names into the argument list for the function. Advantageously, the approach proposed in these teachings provides a means for automatically populating the input values required.

As with output values, mapping of input values also relies on named cells (or ranges) being matched to input parameter names. Advantageously, this approach also allows us to make any number of the input arguments optional in the list, even although they might be required within the function.

Note that this is a different case from that where one or more input parameters are truly optional and it is important to distinguish between these two types of optional input parameter:
Where a parameter is optional due to the presence of a matching named cell that contains the input value (the focus of these teachings)
Where a parameter is optional due to an internal feature of the function itself (i.e. where the default value will be supplied by the function)

The second of these cases is commonly used in spreadsheet worksheet functions and general software development and will not be considered further here. In practice, omitted parameters must either be at the end of the list or be indicated by some form of custom syntax, such as an empty parameter between commas.

There are a number of different ways in which input parameter lists can be specified. Note that in these teachings we assume that we are working with a multi-output function, although the mechanism of named-range mapping for input parameters will obviously also apply to a standard single-output function.

In a preferred embodiment the function parameter list would have the following layout:
FunctionName(Title, InputsWorksheet, [Params])

Where [Params] signifies an array of input parameters in addition to the title and worksheet parameters.

Title:
This is the title text that should be displayed in the cell containing the function call (the "containing cell"). In other words a multi-output function will return a string value as it's standard output to the containing cell. This is in contrast to standard single-output functions, where the return value is displayed in the containing cell. In a multi-output function three possible scenarios for the containing cell are:
The function simply returns the title that was passed in via the parameter list
An error occurs in the function and it returns an error message or code to the containing cell
If the user does not specify a title parameter, or if the title argument is empty, then the function returns a default title that has been pre-specified in the function's software code The use of the containing cell to display a title is a convenient way to handle a standard return value for a multi-output function.

If no matching input names are found in the workbook then the function should return an error message indicating "No inputs found" to the calling cell. If no matching output names are found in the workbook then the function should return an error message indicating "No outputs found" to the calling cell.

InputsWorksheet:

In the simplest embodiment this parameter is a worksheet name that holds all the required named input cells. In a second embodiment this comprises an array of worksheet names that contain the named input cells. By specifying one or more worksheet names we can force the function to search only those worksheets for the named cells. This in turn allows for multiple instances of a named cell (or range).

For example, a workbook with worksheets called "Sheet1" and "Sheet2" can have named ranges with the same name, as long as the scope (or visibility) of those names is constrained to the worksheet level. This is standard practice in common spreadsheet applications. By using worksheet-scope named ranges a single workbook can contain multiple instances of a multi-output worksheet function. For input values there will sometimes be advantages in having workbook-scope named ranges. For example, cells that contain values of physical constants (freezing temperature of water, Pi, etc) or a standard fixed value (e.g. an interest rate).

[Params]:

If an input parameter has been left blank then the function searches for named cells that match the specified input names for the function. This is illustrated by the workflow shown in FIG. 4. Note that this is essentially the same as the workflow for the output values, but with the direction of data flow obviously reversed.

Consider an example where we have a function "Func1" that requires two inputs (Input1, Input2). Two possible syntax examples for entering the formula in a cell are as follows:

=Func1(Title, InputsWorksheet):

In this case we have not specified any additional parameters in the function call, only the title and the inputs worksheet. The function will search for named cells Input1 and Input2 and if they do not exist will return an error message in the calling cell.

=Func1(Title, InputsWorksheet, R5C5):

In this case we override the naming convention and specify cell R5C5 as an input cell. Because we are using name-based mapping this form of the syntax allows us to mix reference-based inputs into the parameter list at any point.

Figure 4:
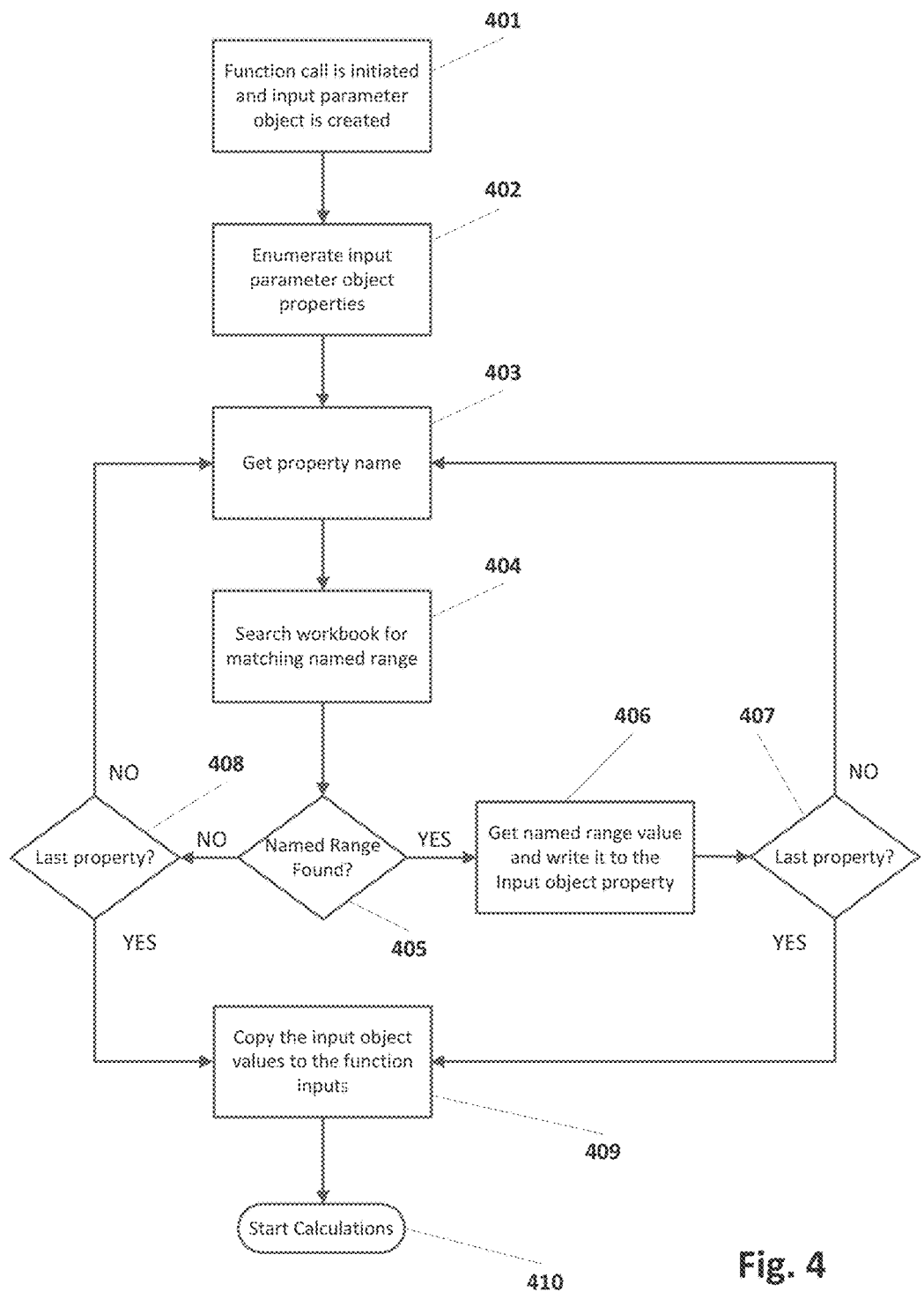
FIG. 4: Flow diagram for automatically building an input parameter list.

For example, the workflow of FIG. 4 can be modified in the following way:
- Enumerate the properties while incrementing an index value
- Store the index of any missing named ranges in the parameter list
- After completing the enumeration scan the input list for reference-based inputs
- Attempt to match any reference-based inputs to gaps in the named-range list The above examples are obviously only two possible example formats: Other possibilities based on the preceding teachings will be obvious to those skilled in the art.

Note that the multi-value approach described in this document does not rely on associating a complex object with a worksheet cell, in contrast to other approaches. Rather, any multi-value objects remain associated with the worksheet function and only the function's output values are associated with the worksheet. In addition, our approach does not require any need for object lifetime management, as is often the case in approaches involving cell objects.

Spreadsheet Applications

Advantageously, by combining automatic input parameter population with multi-output functions users can create spreadsheet-based applications with different functional entities based on worksheet templates that already contain the required named ranges.

For example, using the previously mentioned regression example, the user could create a template worksheet for the regression model input parameters (a "dialog" worksheet) and a separate template worksheet for the regression calculation outputs.

In a preferred embodiment, the spreadsheet application allows customization of the menus through the provision of a scripting language, as well the creation of new worksheet functions. An example of this is the Visual Basic for Applications (VBA) scripting language provided by Microsoft Excel, which allows the user to add new menu items linked to functional scripts. Such scripts can be configured to create new worksheets from templates.

In a further embodiment, the system described in these teachings can include so-called dialog forms that are used to simplify the specification of the input parameters. A dialog form differs from the dialog worksheet described above in that it is a software object created specifically for handling user input. The VBA scripting language mentioned above has such a capability, as do the compiled-library approaches (e.g. XLLs, COM add-ins or any other compiled code library). The same name-mapping approach described in these teachings can also be used to map the input controls of a dialog form to the input named ranges used by a function.

Figure 5:
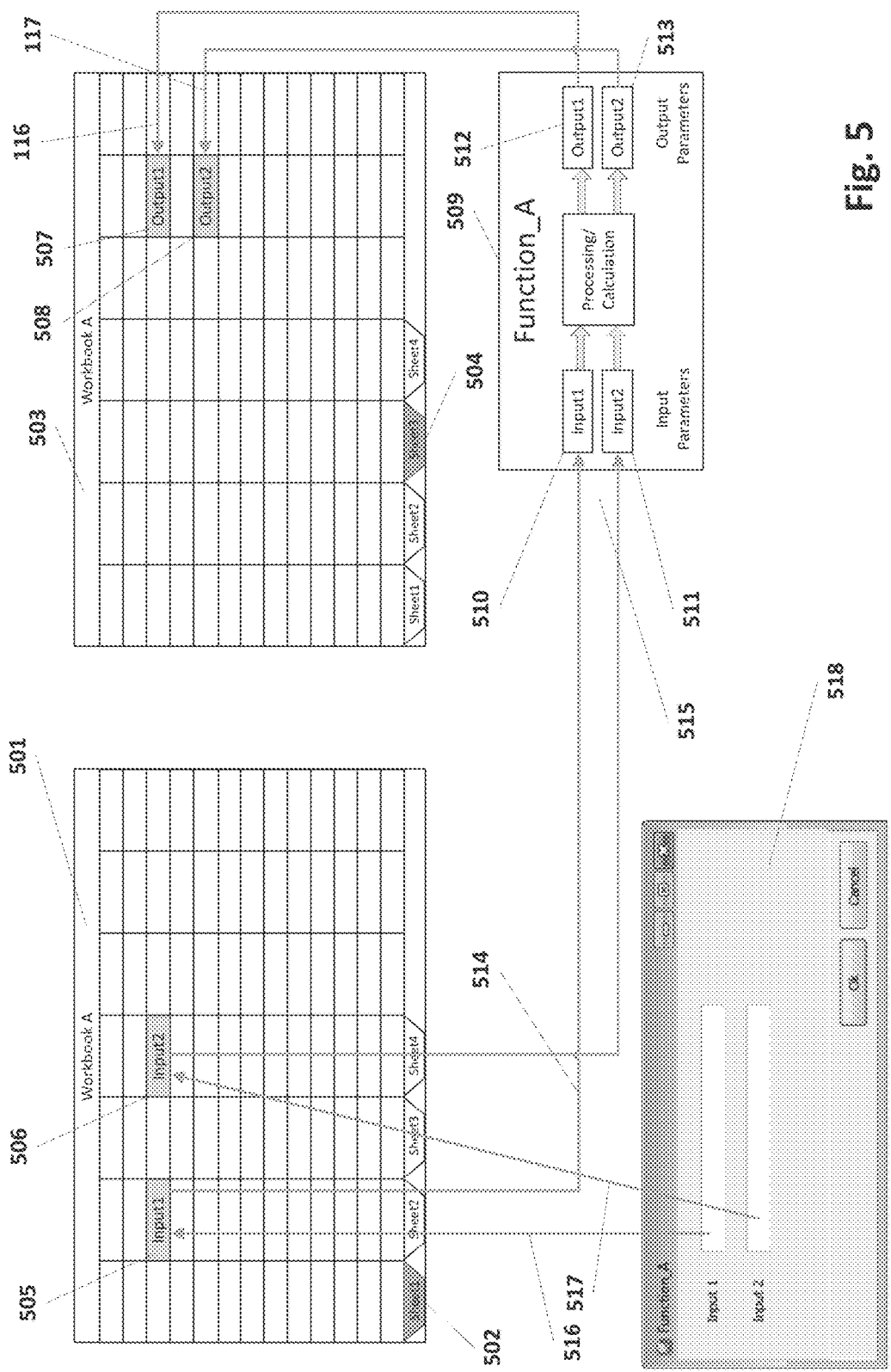
FIG. 5: Mapping a dialog form to function inputs.

In FIG. 5 we show a variant of the scenario illustrated in FIG. 1. In FIG. 5 we have two differences:
- The input named cells are located on a single input (or dialog) worksheet (Sheet1—502)
- The input named cells are mapped (516, 517) to the input controls of a dialog form 518

Note that the input named cells need not be located on the same worksheet: We are simply illustrating the use of the dialog worksheets described in these teachings. In a further embodiment the dialog worksheet can be hidden from the user, which in turn can provide greater control over the entering of the input values.

Multiple Instances of a Mapped-Parameter Function

Spreadsheet worksheet functions can be broadly classified into intermediate-type functions and reporting-type functions. An example of an intermediate function is the OFFSET function: The result of using OFFSET is unlikely to be of interest on its own—it is typically used for intermediate calculations in larger models. An example of a reporting function would be the LINEST linear regression function, where the calculated outputs are likely to be the final result required by the user. Any further use of LINEST output is most likely to be in further reporting, such as in charts.

So far, the systems and methods of the current teachings describe a situation where only one instance of a multi-output worksheet function can reside on a worksheet. Adding two or more of the same function to a given worksheet would obviously lead to a conflict when outputting the values to the named ranges. Multi-output worksheet functions are most likely to be reporting-type functions and in practice this single-instance limit will rarely be a limitation.

For circumstances where more than one instance is required then a simple modification to the input parameter list provides a solution. Specifically, a further embodiment wherein a prefix parameter is included in the list of inputs allows a function to distinguish between multiple named input and output ranges.

For example, extending the "Func1" example described above we can have:

=Func1(Title, InputsWorksheet, 'InstA_')

Once again we have not specified any additional input parameters in the function call, only the title and the inputs worksheet and a new parameter "InstA_". "InstA_" is a prefix (or it could be a suffix) that is appended to any names involved in inputs or outputs. In this case the function will search for named cells InstA_Input1 and InstA_Input2, and similarly for any output names. In this way we can have multiple instances of Func1 on the worksheet.

Note that the earlier example of mixed reference and name-style inputs is also a useful approach to handling multiple instances of mapped-name functions.

In order to warn the user of named-parameter conflicts, a preferred embodiment includes a tag indicating that a worksheet function uses name-mapping. When such a function is added to a worksheet the spreadsheet engine should check for other mapped-name functions that use the same named ranges. This is particularly important for output ranges: In some cases mapped input ranges can be shared amongst multiple functions without conflict. If a conflict is detected then an error message should be returned in the calling cell. Schemes for testing conflicts will involve standard software methods and will be obvious to those skilled in the art.

Various modifications and improvements can be made to the above without departing from the scope of the disclosure.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

The invention claimed is:

1. A computerized method of data processing comprising:
providing a spreadsheet engine for use by a computing device and including a spreadsheet workbook having one or more spreadsheet worksheets, the spreadsheet engine managing and executing a computer software application, script or linked library used by the computing device and providing at least a spreadsheet worksheet functions and an output dispatcher;
retrieving values to be used as input values;
the spreadsheet worksheet function processing the input values to derive one or more output values that are contained within an output object or output list defining output value names; and
the output dispatcher comprising name-matching functionality that matches the output value names in the output object or output list defined in the spreadsheet worksheet function to one or more named output worksheet ranges each having a respective output worksheet range name;
wherein each of the named output worksheet ranges are name-matched at runtime to a corresponding output value name defined within the spreadsheet worksheet function, where a named output worksheet range is a cell range that can be addressed by the spreadsheet engine via the output worksheet range name assigned to the respective named output worksheet range.

2. The method of claim 1, wherein the step of retrieving values comprises retrieving values from one or more input worksheet ranges.

3. The method of claim 2, wherein the input worksheet ranges for the step of spreadsheet worksheet function processing are defined as named cell ranges, each having a respective input worksheet range name; and wherein each input worksheet ranges name is name-matched to a corresponding input value name defined within the spreadsheet worksheet function.

4. The method of claim 3, wherein each input worksheet range name is name-matched to a corresponding input value name that is the same as the input worksheet range name.

5. The method of claim 3, wherein either the input worksheet range name or the input value name comprises a pre defined suffix or prefix.

6. The method of claim 1, wherein either the output worksheet range name or the output value name contains a pre defined suffix or prefix.

7. The method of claim 1, wherein the input values are automatically populated based on the output list of the spreadsheet worksheet function.

8. The method of claim 7, wherein any number of input values are optional on the output list even if they are required within the spreadsheet worksheet function.

9. The method of claim 1, wherein a user can customize an output format of a spreadsheet worksheet by creating or deleting different named output worksheet ranges.

10. The method of claim 9, wherein different outputs can be presented to different users according to user permissions or roles.

11. The method of claim 10, wherein a user can specify different layouts for the different outputs.

12. The method of claim 11, wherein the outputs are located next to cells with descriptive labels.

13. The method of claim 1, wherein the step of the spreadsheet worksheet function processing the input values to derive one or more output values is implemented with a software object.

14. The method of claim 13, wherein, after the spreadsheet worksheet function processing has been completed, the output object defined by computer software code is created that holds the output value names and the corresponding output values.

15. The method of claim 14, wherein the output object exposes property names and types to be determined by a system at runtime using runtime type information.

16. The method of claim 13, wherein, after the spreadsheet worksheet function processing has been completed, the output list defined by computer software code is created, each item of which containing a single output value name and the corresponding output value.

17. The method of claim 15, wherein the output list exposes output value names and types to be determined by a system at runtime using runtime type information.

18. The method of claim 1, wherein the data processing is implemented with the script defined by computer software code which is in turn managed by a scripting engine which is in turn linked to the spreadsheet engine.

19. The method of claim 1, wherein the first spreadsheet worksheet function is incorporated into the linked library that is in turn linked to the spreadsheet engine.

20. The method of claim 1, wherein outputs from multiple functions are communicated to the spreadsheet workbook via the output dispatcher.

21. The method of claim 20, wherein the output object or output list is returned to the spreadsheet engine, which in turn manages the name-matching of the output value names to the matching named output worksheet ranges and dispatching of the associated output values.

22. The method of claim 1, wherein source values retrieved from one or more separate functions are involved in the step of the spreadsheet worksheet function processing the input values to derive one or more output values.

23. The method of claim 1, wherein source values retrieved from a web service are involved in the step of the spreadsheet worksheet function processing the input values to derive one or more output values.

24. The method of claim 1, wherein source values retrieved from a data source such as a database or file are involved in the step of the spreadsheet worksheet function processing the input values to derive one or more output values.

25. The method of claim 1, wherein different subsets of a full set of output values can be presented to a user by creating named output worksheet ranges that match the names of a required subset of the available function outputs by having the output dispatcher discard output values where a name-match is not found.

26. A data processing system comprising a spreadsheet engine stored in a computer-readable medium of a computing device having one or more processors, the spreadsheet engine including a spreadsheet workbook having one or more spreadsheet worksheets, the spreadsheet engine managing and executing a computer software application, script or linked library used by the computing device and providing at least a spreadsheet worksheet functions- and an output dispatcher; means of retrieving values to be used as input values; the spreadsheet worksheet function processing the input values to derive one or more output values that are contained within an output object or output list defining output value names; and the output dispatcher comprising name-matching functionality that matches the output value names in the spreadsheet worksheet function to one or more named output worksheet ranges each having a respective output worksheet range name; wherein each of the named output worksheet ranges are name-matched at runtime to a corresponding output value name defined within the spreadsheet worksheet function, where a named output worksheet range is a cell range that can be addressed by the spreadsheet engine via the output worksheet range name assigned to the respective named output worksheet range.

27. A computer program product comprising a non-transitory computer-readable medium and instructions, that, when executed on a computing device, enable it to function as a data processing system comprising: a spreadsheet engine used by the computing device and including a spreadsheet workbook having one or more spreadsheet worksheets, the spreadsheet engine managing and executing a computer software application, script or linked library used by the computing device and providing at least a spreadsheet worksheet functions and an output dispatcher; and a means of retrieving values to be used as input values; the spreadsheet worksheet function processing the input values to derive one or more output values that are contained within an output object or output list defining output value names; and an output dispatcher comprising name-matching functionality that matches the output value names in the output object or output list defined in the spreadsheet worksheet function to one or more named output worksheet ranges each having a respective output worksheet range name; wherein each of the named output worksheet ranges are name-matched at runtime to a corresponding output value name defined within the spreadsheet worksheet function, where a named output worksheet range is a cell range that can be addressed by the spreadsheet engine via the output worksheet range name assigned to the respective named output worksheet range.

28. A computerized method of data processing in a spreadsheet workbook of a spreadsheet engine for use by a computing device, the spreadsheet workbook having one or more spreadsheet worksheets, the spreadsheet engine managing and executing a computer software application, script or linked library used by the computing device, the method comprising:
  retrieving via the spreadsheet engine input values from one or more named input worksheet ranges each having a respective input worksheet range name;
  processing via a spreadsheet worksheet function of the spreadsheet engine data in the named input worksheet ranges to derive one or more output values that are contained within an output object or output list defining output value names; and
  matching via an output dispatcher of the spreadsheet engine the resulting output value names from the spreadsheet worksheet function to one or more named output worksheet ranges each having a respective output worksheet range name;
  wherein each of the named output worksheet ranges are name-matched at runtime to a corresponding output value name defined within the spreadsheet worksheet function, where a named output worksheet range is a cell range that can be addressed by the spreadsheet engine via the output worksheet range name assigned to the respective named output worksheet range.

29. The method of claim 28, wherein either the output worksheet range name or the output value name contains a pre defined suffix or prefix.

30. The method of claim 28, wherein each input worksheet range name is name-matched to a corresponding input value name that is the same as the input worksheet range name.

* * * * *